United States Patent
Kauffman

(10) Patent No.: US 9,893,391 B1
(45) Date of Patent: Feb. 13, 2018

(54) BATTERY WATER LEVEL DETECTOR FOR A BATTERY OPERATED DEVICE

(71) Applicant: Pacific Steamex Cleaning Systems, Inc., Muskegon, MI (US)

(72) Inventor: Kipling J Kauffman, Zeeland, MI (US)

(73) Assignee: Pacific Steamex Cleaning Systems, Inc., Muskegon, MI (US)

( * ) Notice: Subject to any disclaimer, the term of this patent is extended or adjusted under 35 U.S.C. 154(b) by 501 days.

(21) Appl. No.: 14/491,395

(22) Filed: Sep. 19, 2014

Related U.S. Application Data

(60) Provisional application No. 61/881,164, filed on Sep. 23, 2013.

(51) Int. Cl.
*H01M 10/48* (2006.01)
*A47L 11/40* (2006.01)

(52) U.S. Cl.
CPC ....... *H01M 10/488* (2013.01); *A47L 11/4005* (2013.01); *A47L 11/4011* (2013.01); *H01M 10/484* (2013.01)

(58) Field of Classification Search
None
See application file for complete search history.

(56) References Cited

U.S. PATENT DOCUMENTS 3,362,224 A * 1/1968 Melone ............... G01F 23/2922
123/41.15
8,330,467 B2 * 12/2012 Jones .................. B66F 9/24
324/425
2003/0080304 A1 * 5/2003 Campau ............... A01G 27/008
250/573
2006/0257707 A1 * 11/2006 Kaschmitter ....... H01M 8/0687
429/412
2008/0001577 A1 * 1/2008 Sather ................ B60C 23/0411
320/162
2010/0163321 A1 * 7/2010 Goff ..................... B60K 6/46
180/65.21
2010/0167109 A1 * 7/2010 Campau ............... H01M 2/1252
429/82

(Continued)

FOREIGN PATENT DOCUMENTS

EP 1096593 * 5/2001 ............ H01M 10/48

OTHER PUBLICATIONS

Trojan Battery Company, "HydroLink Watering System—Battery Watering Made Easy", Apr. 2009.

*Primary Examiner* — Ula C Ruddock
*Assistant Examiner* — Amanda Barrow
(74) *Attorney, Agent, or Firm* — Gardner, Linn, Burkhart & Flory, LLP

(57) ABSTRACT

A battery water level detector assembly for a battery operated device comprising a control unit configured for use with a battery of the device, with the control unit including an electronic sensor operative to provide a signal indicative of the water level within the battery and with the control unit being operative to provide a control signal in response thereto. The electronic sensor is operative to detect when a visual indicator operably connected to the battery provides a display that the water level within the battery has decreased below a desired level. The control signal in turn may be used to generate an alert, including a remotely transmitted alert, and/or alter operational functionality of the battery operated device.

19 Claims, 11 Drawing Sheets

(56) References Cited

U.S. PATENT DOCUMENTS

| | | |
|---|---|---|
| 2012/0058369 A1 | 3/2012 | Beckley et al. |
| 2013/0039810 A1* | 2/2013 | Riechers ................ C12M 41/02 422/82.05 |
| 2013/0143082 A1* | 6/2013 | Kim .................... H01M 2/1077 429/82 |

* cited by examiner

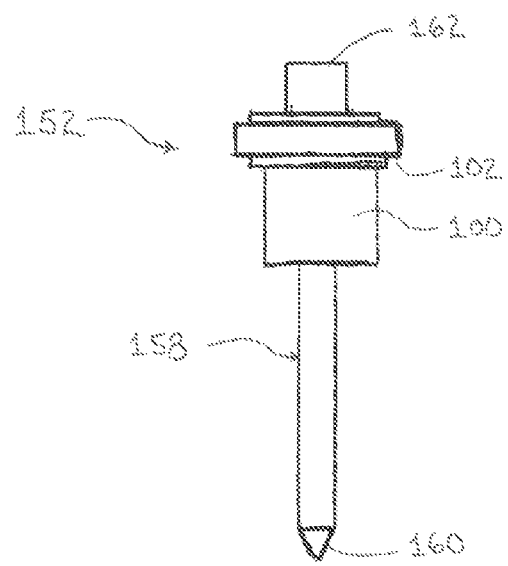
FIG. 10
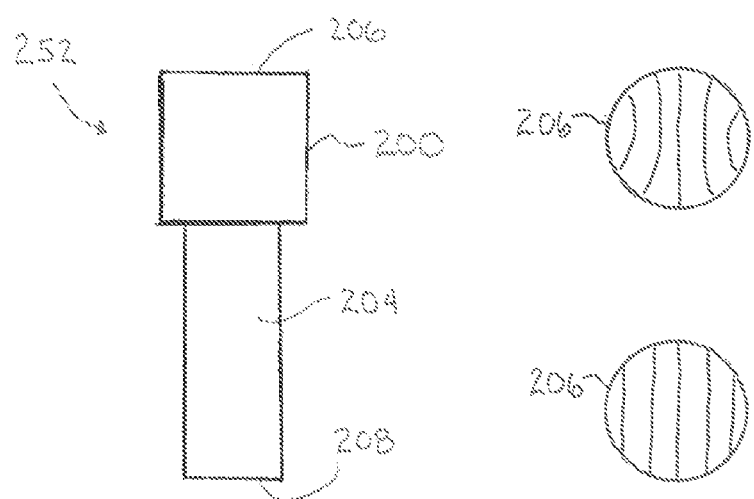
FIG. 11
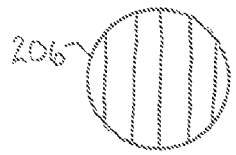
FIG. 11A
FIG. 11B

BATTERY WATER LEVEL DETECTOR FOR A BATTERY OPERATED DEVICE

CROSS REFERENCE TO RELATED APPLICATION

The present application claims priority of U.S. provisional application Ser. No. 61/881,164 filed Sep. 23, 2013, by Kipling J. Kauffman, which is hereby incorporated herein by reference in its entirety

BACKGROUND OF THE INVENTION

The present invention is directed to a device, system and method for detecting the water level in a battery operated device, and in particular for providing an alert and/or controlling operation of the device.

Numerous types of equipment or devices operate utilizing rechargeable lead-acid batteries, such as floor scrubbers, carpet extractors, floor burnishers, vacuums, golf carts, forklift trucks, automated guided vehicles, electric transportation carts, such as people movers used in airports, utility carts, man lifts, tuggers, and the like. The batteries of such devices require water because the water off gasses during use of the battery. Accordingly, intermittent maintenance to the batteries is required to replenish the water as needed based on use of the device and batteries. It is important in such batteries that the proper water level be maintained in order to prevent damage to the battery that otherwise can occur when the batteries are used with low water levels.

SUMMARY OF THE INVENTION

The present invention provides a battery water level detector for a battery operated device, and a method of detecting water level within a battery and providing a signal in response thereto to provide a warning and/or control operation of the device.

According to an aspect of the present invention, a battery water level detector comprises a control unit mountable to a battery, with the control unit including an electronic sensor. The electronic sensor is operative to provide a signal indicative of the water level within the battery, with the control unit in turn being operative to provide a control signal in response thereto. In particular embodiments the electronic sensor detects when a visual indicator on the battery provides a display that the water level within the battery has decreased below a predetermined level. The detector assembly may further include a cap assembly that is mountable to the battery within one or more holes provided on the battery by the manufacturer, where the cap assembly includes the visual indicator for providing a display that the water level within the battery has decreased below a predetermined level.

According to a further aspect of the present invention, a battery operated device is provided that employs a battery water detector assembly, where the output signals from the detector assembly control sensory signals and/or operational parameters of the battery operated device. In particular embodiments the battery operated device includes an alert mechanism that is operative to provide a visible warning light, an audible sound, or a tactile warning when the controller provides a control signal in response to detection of a low battery water level. Alternatively or additionally, the control signal output by the controller is operative to alter the battery powered operational functionality of the battery powered device in response to detection of a low battery water level condition.

According to an aspect of the present invention, a floor scrubber includes a battery water level detector assembly comprising a controller and an electronic sensor, with the floor scrubber further comprising a battery, a scrubber head, and a scrubber head motor for operating the scrubber head, with the scrubber head motor being powered by the battery and with the battery including a battery opening. The electronic sensor is operative to provide a signal to the controller indicative of the water level within the battery with the controller being operative to provide control signals in response thereto to control operation of the floor scrubber. In particular embodiments, the controller provides a control signal to prevent the scrubber head motor from operating upon detection that the water level within the battery is below a predetermined limit and/or the floor scrubber further includes an indicator light with the controller providing a control signal to illuminate the indicator light upon detection that the water level within the battery is below a predetermined limit. Still further, a drive motor for providing motive power to the floor scrubber may continue to operate even in the condition of a low battery water level in order to enable the floor scrubber to be returned to a storage or maintenance location.

The battery water level detector assembly includes an indicator extending into the battery through the battery opening and has a lower end and an upper end, with the lower end configured to contact internal water of the battery when the battery water level is at a desired height. The electronic sensor in turn provides a signal to the controller indicative of a low water level condition in response to the water level within the battery dropping below the lower end of the indicator. In a particular embodiment the indicator is an optical indicator and the electronic sensor comprises a light sensor, such as an infrared light sensor, aligned with the upper end of the indicator.

In still further embodiments, the battery water level detector assembly comprises a cap assembly mountable to the battery over the battery opening and a control unit that includes the electronic sensor and controller. The control unit may further comprise a separate housing that is mountable to the cap assembly.

The battery water level detector system of the present invention avoids the necessity of having an individual manually check the battery water level, and is operationally employed to provide alert signals regarding a low water level condition and/or control operation of the battery powered device without requiring additional holes or openings in the battery that could void battery warranties. In the case of a floor scrubber battery powered device, for example, refilling of the batteries is further ensured by preventing the scrubber head motor or motors from operating when a low level condition is detected. Thus, problems associated with drawing current from the batteries by operation of a battery powered device, such as a floor scrubber, when the water level is too low are thereby avoided.

These and other objects, advantages, purposes and features of this invention will become apparent upon review of the following specification in conjunction with the drawings.

BRIEF DESCRIPTION OF THE DRAWINGS

FIGS. 10-12 disclose alternative embodiments of cap assemblies for providing a visual indicator of the battery water level.

DESCRIPTION OF THE PREFERRED EMBODIMENTS

Figure 1:
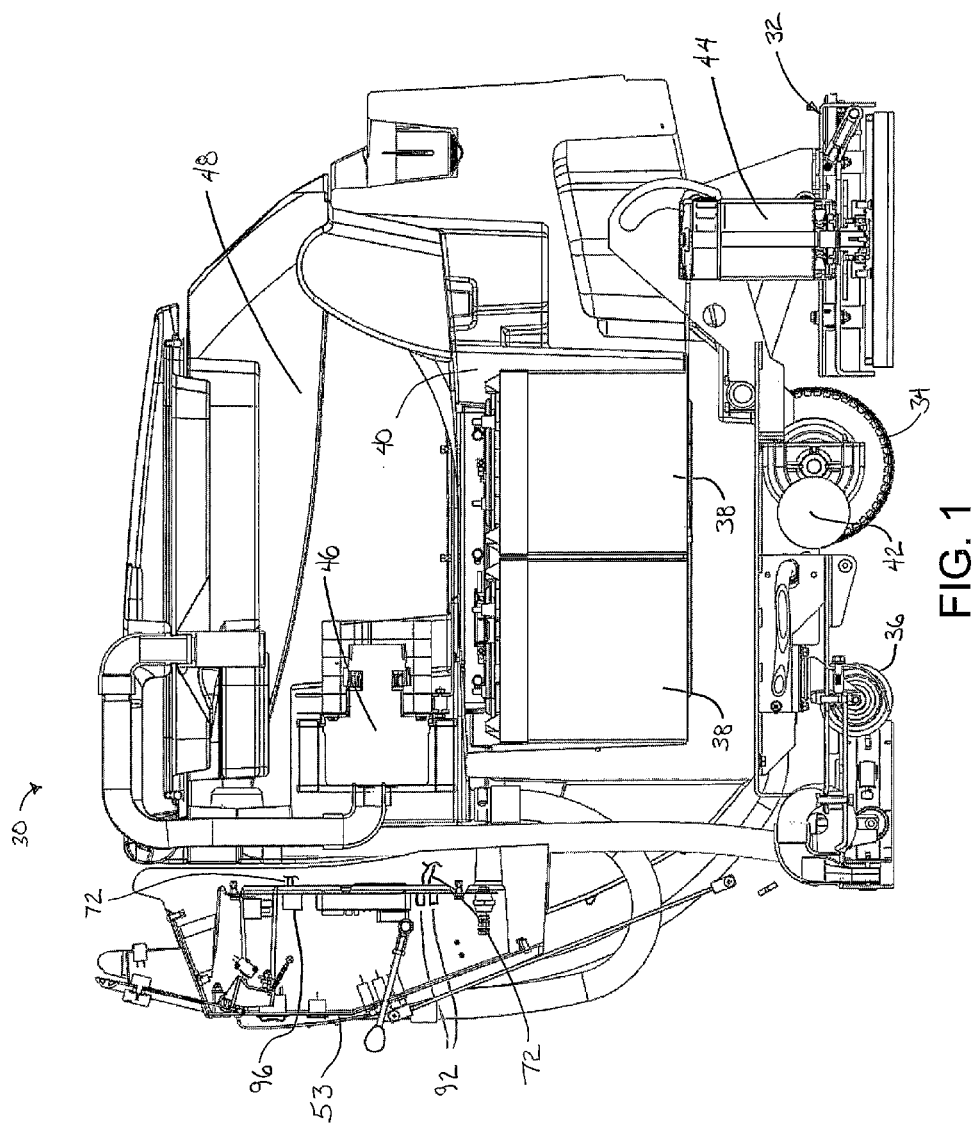
FIG. 1 is a side sectional view of a floor scrubber incorporating a battery water level detector in accordance with the present invention.

The present invention will now be described with reference to the accompanying figures, wherein the numbered elements in the following written description correspond to like-numbered elements in the figures. A battery operated device, which in one embodiment comprises a floor scrubber 30 with a head 32 for cleaning floors is shown in FIG. 1, where floor scrubber 30 is an operator walk-behind type scrubber having a base assembly with forward wheels 34 and rear wheels 36 for supporting movement of scrubber 30 on a floor, as well as various tanks for providing cleaning fluid and suctioning and retaining used fluid from the floor. Floor scrubber 30 includes multiple batteries 38 retained within a battery compartment 40, where batteries 38 are used to provide operational power to floor scrubber 30. Batteries 38, for example, are used for powering drive motors 42 for driving wheels 34 to assist in moving floor scrubber 30, and for powering motor 44 of cleaning head 32, as well as for providing power to the motor 46 used to create a vacuum in tank 48 and thereby suction fluid from the floor being cleaned.

Figure 2:
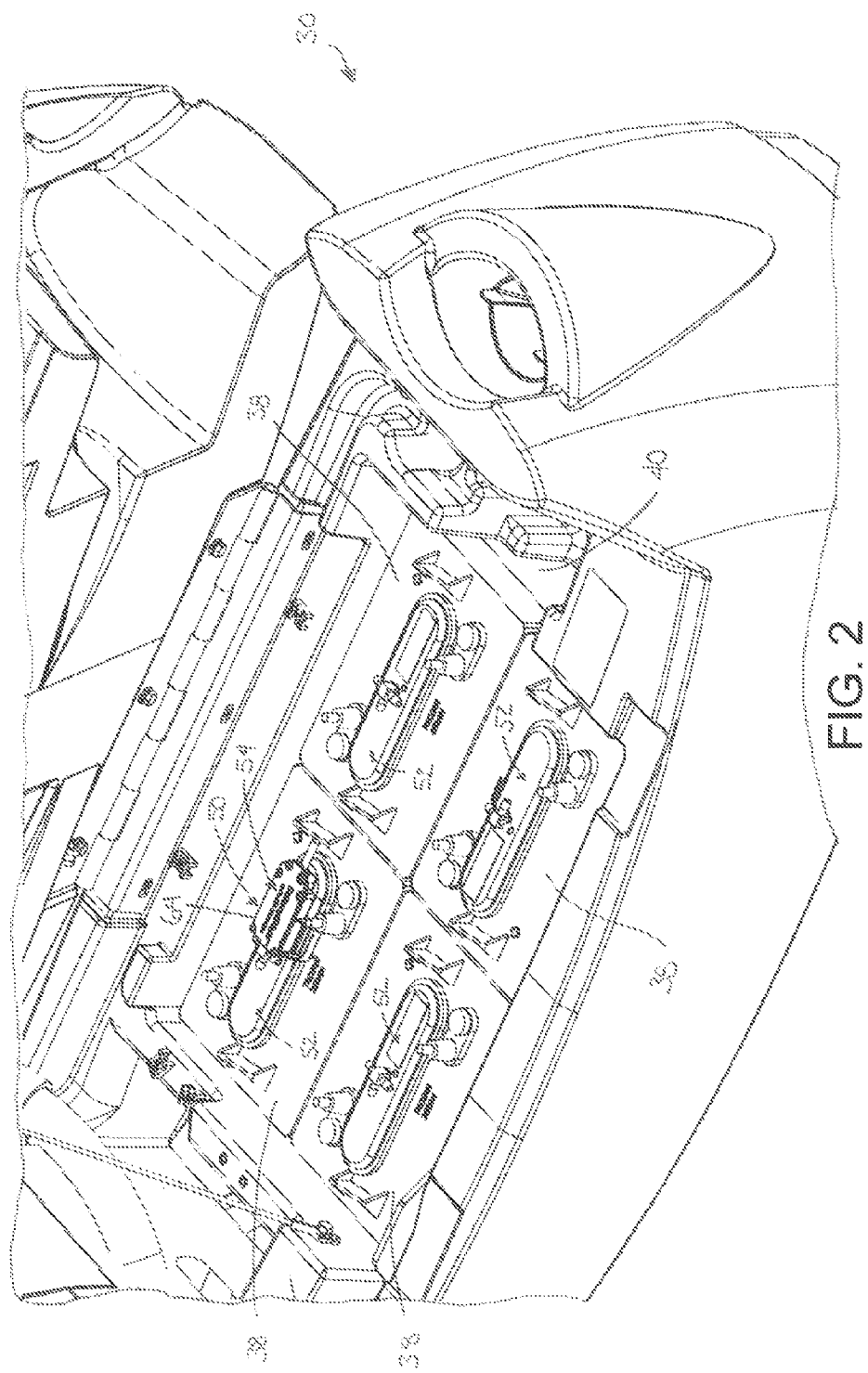
FIG. 2 is a partial top perspective view of the floor scrubber of FIG. 1 with a cover assembly lifted for viewing the battery compartment of the floor scrubber and disclosing a battery water level detector assembly in accordance with the present invention.
Figure 3:
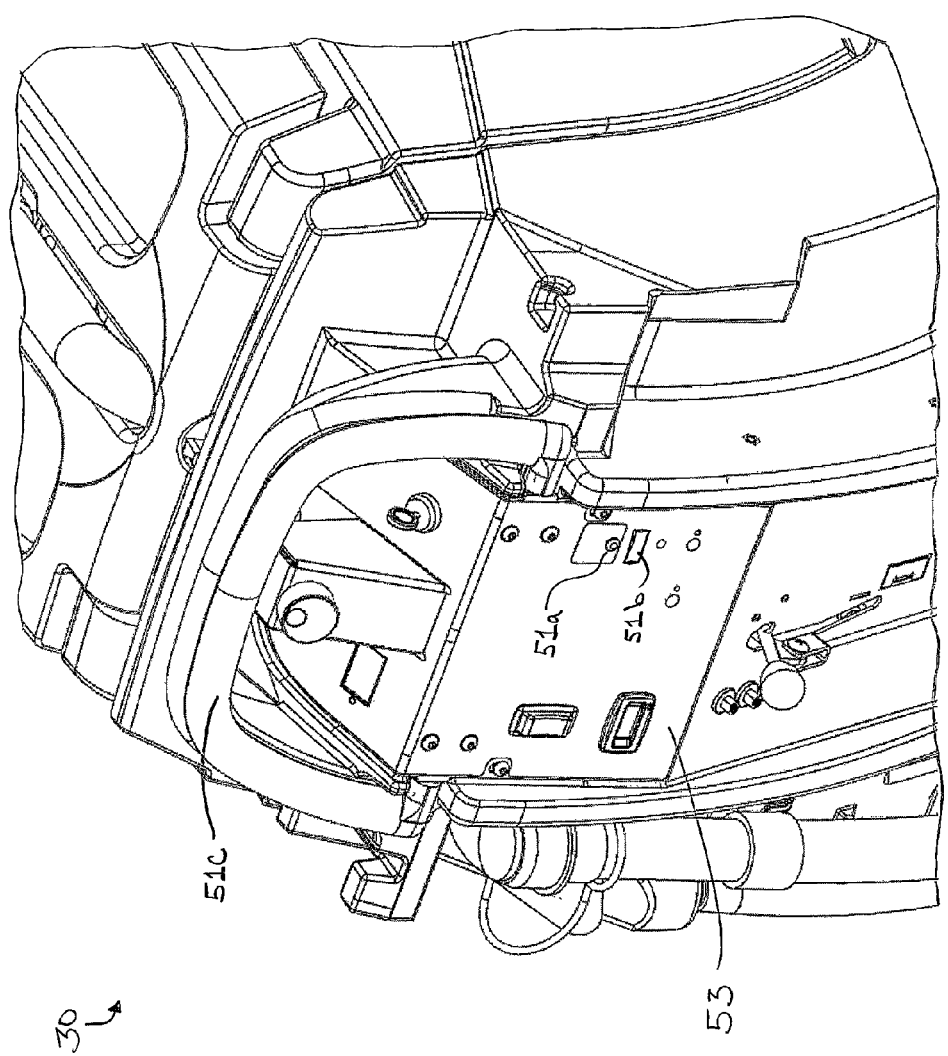
FIG. 3 is a rear perspective view of the floor scrubber of FIG. 1 showing a control panel with a water indicator light.

Batteries 38 are conventional batteries that include multiple cells containing water for operation of batteries 38. As shown in FIG. 2, batteries are provided with a battery water level detector assembly 50 (one shown in FIG. 2), which in the illustrated embodiment comprises a cap assembly or manifold assembly 52 and a control unit 54. As discussed in detail below, assembly 50 is operable to detect when the water level within battery 38 has dropped below a desired, pre-set level. Assembly 50 then provides a warning or an alert to the operator of floor scrubber 30, such as illuminating low level water light 51a located on a control panel 53 at the rear of floor scrubber 30 (FIG. 3). Assembly 50 also controls operation of floor scrubber 30 to limit or alter battery powered operational usage or functionality of scrubber 30 upon detection of a low level water condition to thereby inhibit damage to batteries 38 that may occur as a result of being used with a low water level. For example, to prevent operation of motor 44 whereby floor scrubber 30 is inoperable to clean floors until the water within batteries 38 is replenished to the required level. As discussed below, although the battery water level detector assembly 50 is shown in connection with a battery operated device comprising a floor scrubber 30, it should be appreciated that battery water level detector assemblies in accordance with the present invention may be employed with numerous alternative battery operated devices.

Figure 4:
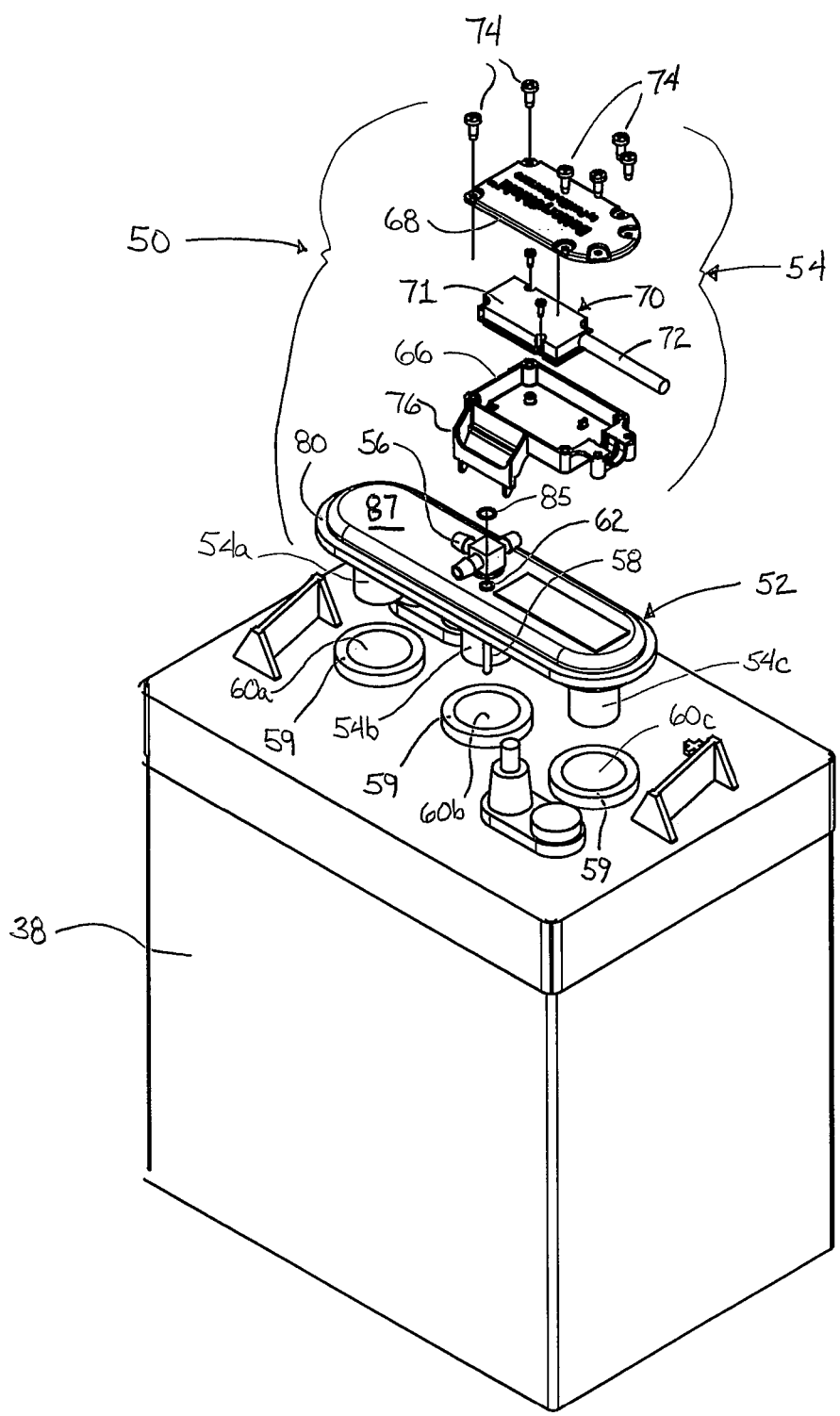
FIG. 4 is an exploded perspective view of the battery water level detector assembly in accordance with the present invention shown relative to a battery and removed from the floor scrubber of FIG. 1.
Figure 4A:
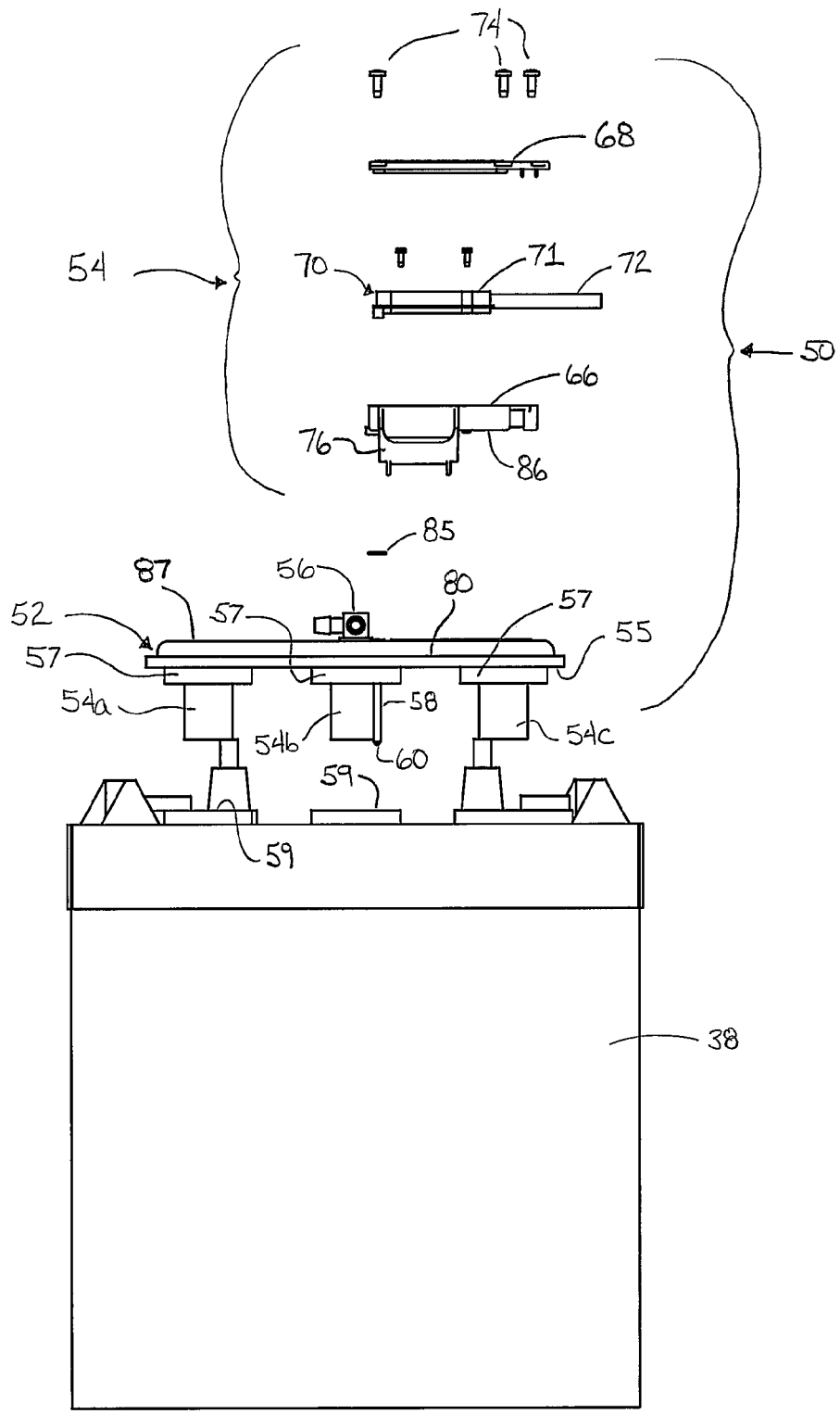
FIG. 4A is a front elevation exploded view of the view of FIG. 4.
Figure 5:
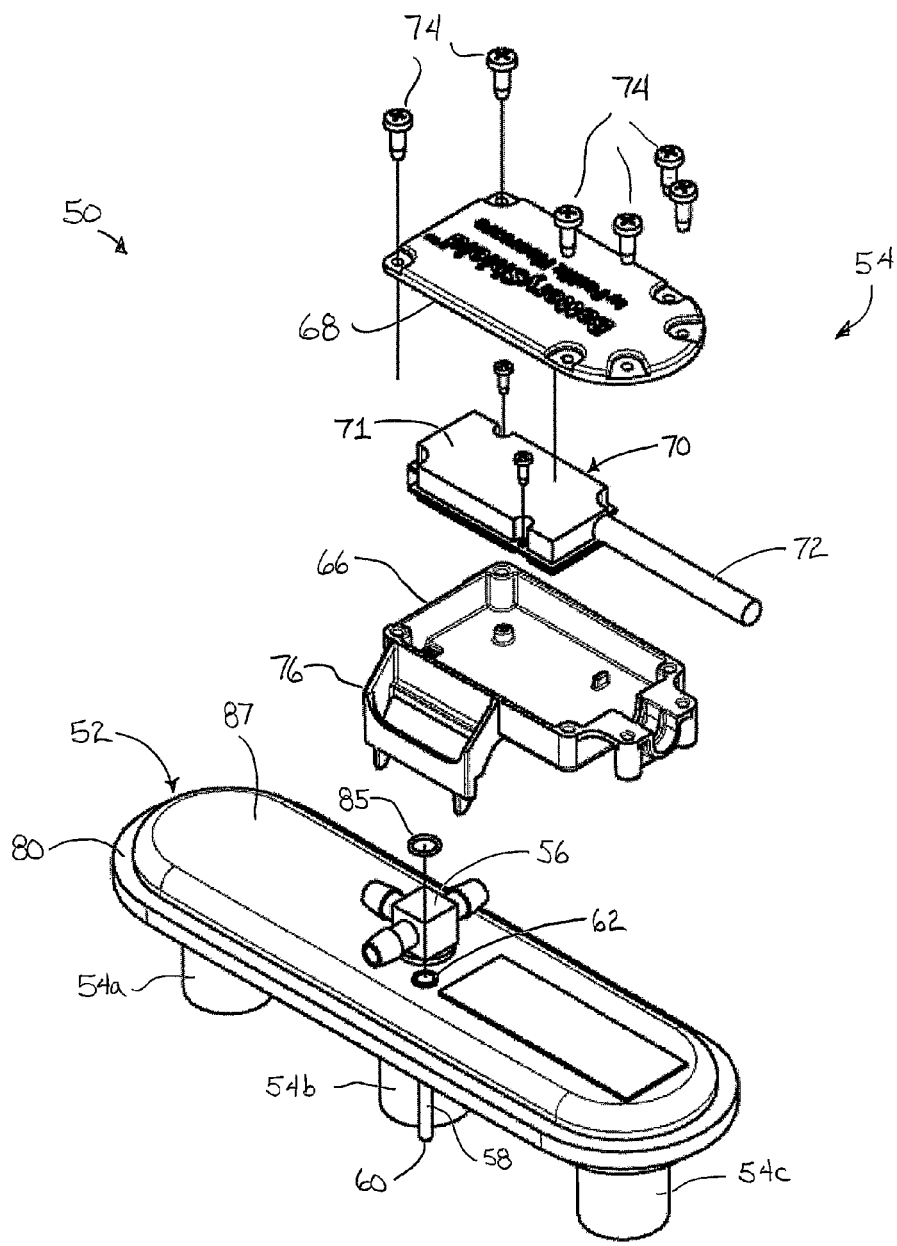
FIG. 5 is a close-up exploded perspective view of the battery water level detector assembly of FIG. 4.

Referring now to FIGS. 4 and 4A, assembly 50 is shown in relation to battery 38. As shown, battery 38 includes three separate ports or openings 60a, 60b, 60c that are provided in battery 38 by the manufacturer of the battery 38 and into which water is selectively supplied for the internal cells of battery 38. Cap assembly 52 is attachable to battery 38 and includes three filler tubes 54a, 54b, 54c that align with respective ones of the openings 60a, 60b, 60c of battery 38. Cap assembly 52 further includes a fluid fitting 56 to which water lines (not shown) are connected for supplying water into battery 38 through internal passages (not shown) leading to filler tubes 54a, 54b, 54c.

Cap assembly 52 also includes a water level indicator, which in the embodiment shown comprises an optical indicator device 58 having a second or lower end 60 and a first or upper end 62. When cap assembly 52 is affixed to battery 38, indicator 58 extends into opening 60b of battery 38. As understood from FIG. 4A, the underside or bottom 55 of cap 52 includes annular flanges 57 that mate with annular flanges 59 on battery 38, where a seal ring may be disposed there between. Indicator 58 passes through cap 52 to extend past the bottom 55 internally of one of the flanges 57 to extend into battery 38.

In operation, end 60 of indicator 58 will extend into and be in contact with the water within battery 38 when the water level within battery 38 is within the proper specified range. The length of indicator 58 is constructed such that when the water level within battery 38 decreases beyond a pre-set limit end 60 will no longer be in contact with the water. In the illustrated embodiment indicator 58 comprises or operates in the manner of a light pipe, with lower end 60 being conical whereby end 62 is able to provide an indication of when the water has decreased beyond a desired limit, such as based on the refraction of light. By way of explanation, when control unit 54 is not installed end 62 has a dark visual appearance when end 60 is submerged in water within battery 38, and end 62 has a white visual appearance when the water level decreases below end 60. Although cap assembly 52 is shown to include three filler tubes for use on a battery having three ports, it should be understood that alternative cap assemblies having more or fewer than three filler tubes may be employed for use with correspondingly constructed batteries.

In the illustrated embodiment, battery 38 and cap assembly 52 comprise a battery and cap assembly provided by the Trojan Battery Company of Santa Fe Springs, Calif., U.S.A., with the cap assembly being provided as part of the HYDROLINK watering system. It should be appreciated, however, that alternative cap assemblies may be readily employed.

Referring now to FIGS. 4-8, control unit 54 includes a housing 64 comprising a base 66 and lid 68 within which a controller or control module 70 is contained, such as a microprocessor contained within housing 71, with controller 70 having wires or leads 72 that extend out of housing 64 and including fasteners 74 to hold lid 68 on base 66 to retain controller 70 within housing 64. Leads 72 are used to provide power to controller 70, as well as to enable various operations or controls to be provided to scrubber 30 by way of control signals provided by controller 70. Base 66 includes a pair of integral downward projecting members or clips 76, 77 with inwardly projecting latches 78, 79, respectively, for attaching or clipping housing 64 to the edge or lip 80 that projects outwardly from cap assembly 52. It should be appreciated that controller 70 may be constructed of various circuitry components, such as may be mounted on a circuit board.

Figure 6:
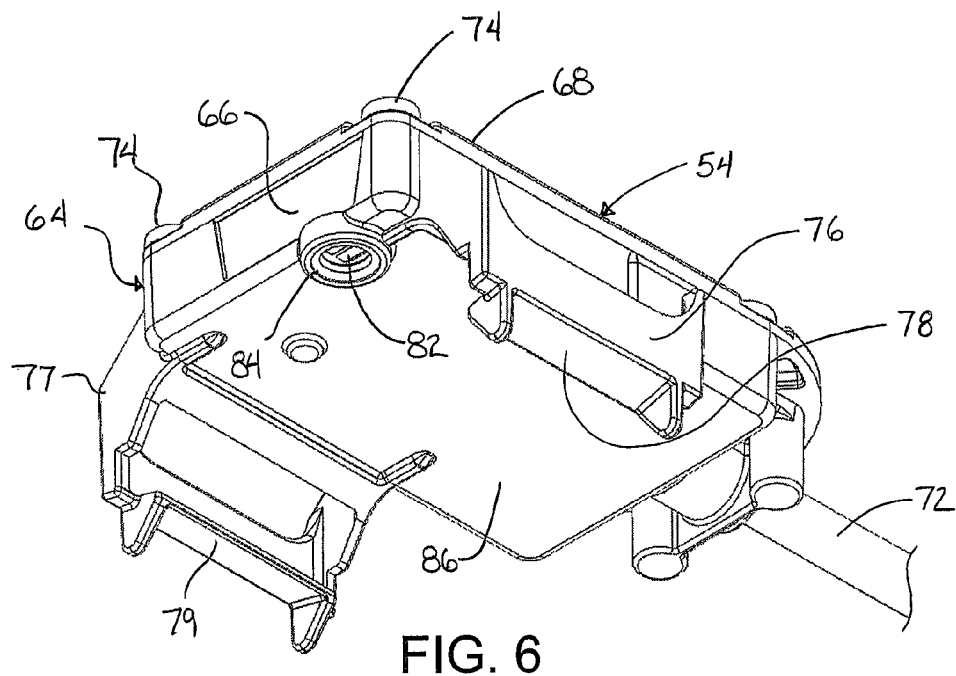
FIG. 6 is a bottom perspective view of a portion of the battery water level detector assembly of FIG. 4.
Figure 7:
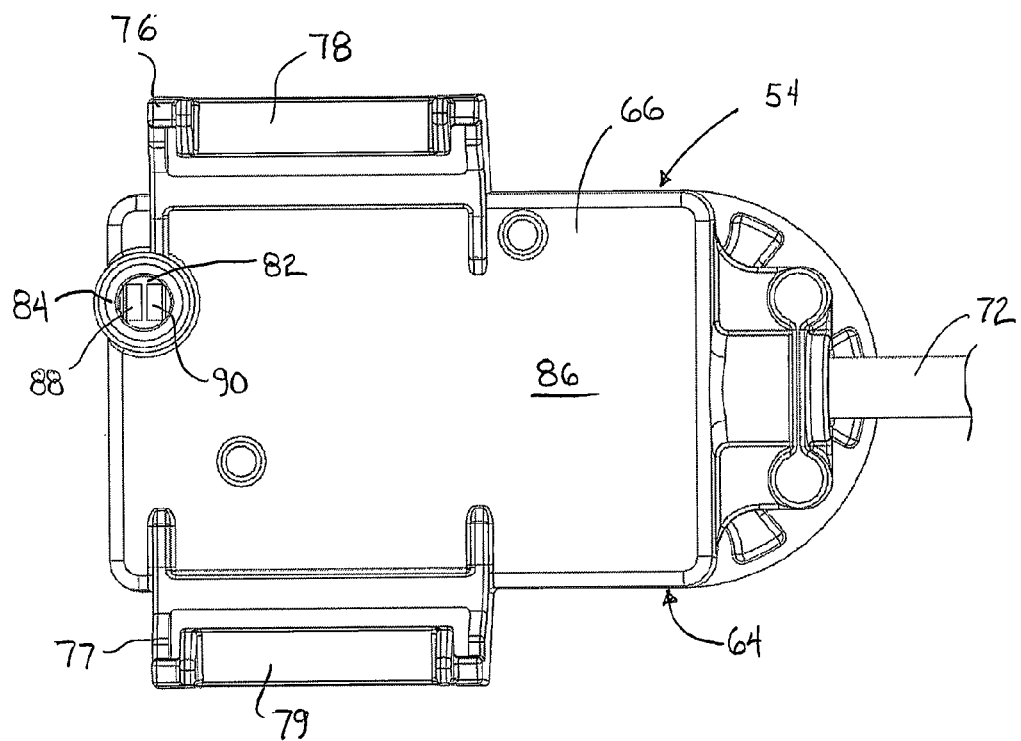
FIG. 7 is a bottom elevation view of the assembly of FIG. 6.
Figure 8:
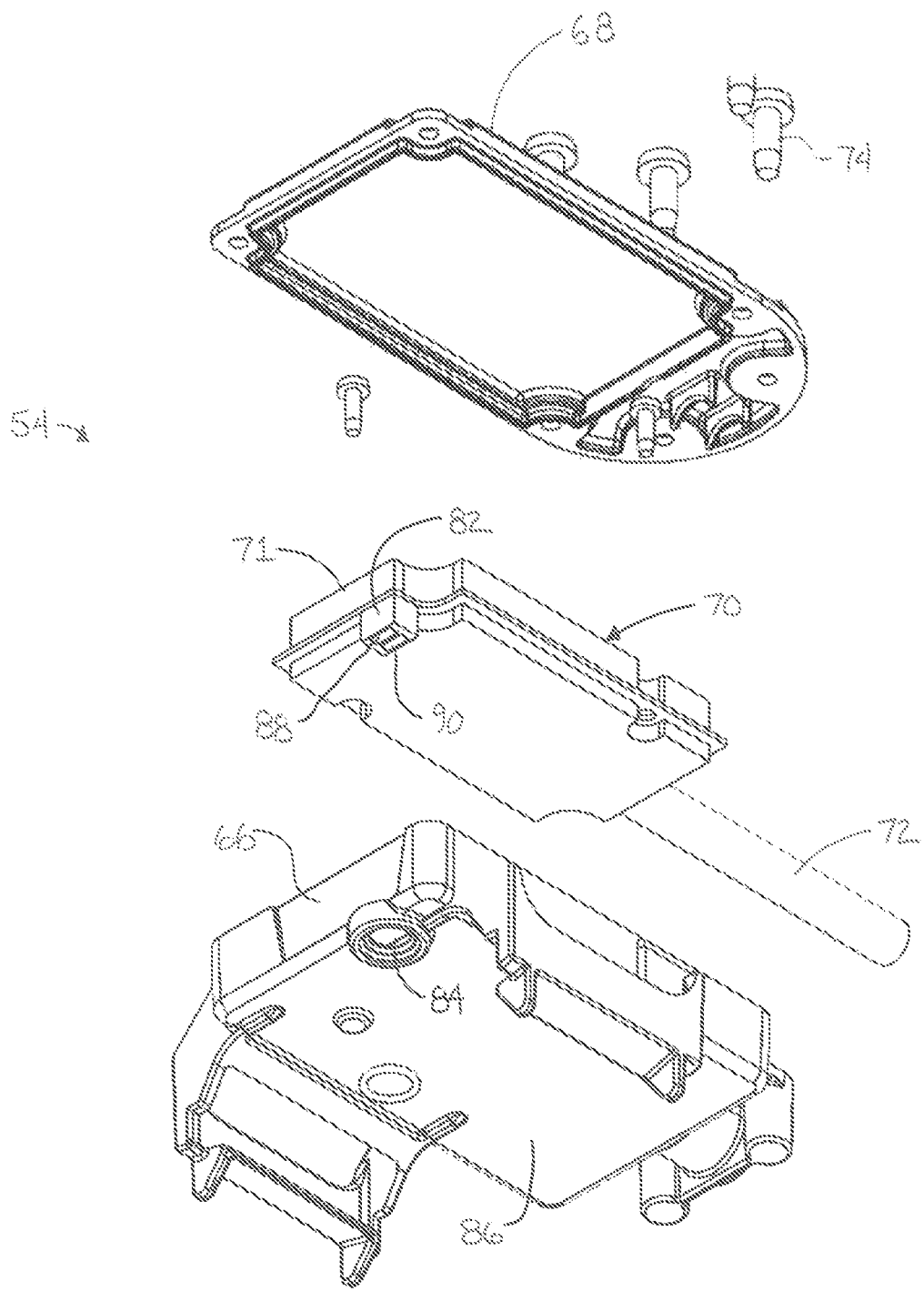
FIG. 8 is an exploded perspective view of the assembly of FIGS. 6 and 7.

As shown in FIGS. 6-8, controller 70 includes an electronic sensor or optical sensor, which comprises a light sensor 82 in the illustrated embodiment that, when assembled into housing 64, aligns with an opening 84 in the bottom 86 of base 66. Housing 64 of control unit 54 is then affixed to cap assembly 52 with opening 84 being aligned with upper end 62 of indicator 58 and a seal ring 85 being positioned at opening 84 between base 66 and the top 87 of cap assembly 52. In the illustrated embodiment sensor 82 is a reflective sensor that consists of an infrared emitting diode 88 mounted side-by-side to a photo detector or phototransistor 90. In operation, sensor 82 is able to detect when the water level in battery 38 has decreased beyond the pre-set desired limit due to the change in reflectivity of lower end 62 of indicator 58 when the water level drops below lower end 62 of indicator 58. That is, sensor 82 provides an output signal indicative of a low water level condition. The level of light detection by sensor 82 is then processed by controller 70, with output signals being provided by controller 70 based thereon. Sensor 82 may be a QRD1113 or QRD1114 Reflective Object Sensor provided by Fairchild Semiconductor Corp. of San Jose, Calif., U.S.A.

As previously noted, upon detecting a low water level condition of battery, controller 70 operates to cause warning light 51 to be illuminated. In addition, leads 72 extend to control relays 92, such as may be located adjacent control panel 53 (FIG. 1) where, upon detection of a low water level condition, relays 92 are tripped by a signal from controller 70 to stop the operation of head 32, as well as prevent further discharge of cleaning fluid from the scrubber 30. For example, in the case of a rotary scrubber head or an orbital scrubber head the motors for imparting movement to the cleaning pads are prevented from operating. Power may still be permitted to be supplied to the drive wheels and/or vacuum, however, to enable discharged water to be collected and to enable the operator to return the floor scrubber 30 to a storage or service location. Detector assembly 50, therefore, prevents the floor scrubber 30 from being used to actually clean floors once the battery water level has decreased below a desired level, but may be configured to still enable an operator to transport the floor scrubber 30 to a location where it may be more readily serviced. Alternatively, instead of relays 92, floor scrubber 30 may be provided with various types of conventional switches or an additional controller for receiving a signal from controller 70 and, in turn, altering operational functionality, such as limiting or preventing certain operations of floor scrubber 30.

Upon re-filling batteries 38 with water to the required level, lower end 62 of indicator 58 will again be submerged, which will be detected by control unit 54 via operation of sensor 82. Upon detection of a proper water level, control unit 54 will turn off warning light 51 and re-set relays 92 to allow continued operation of the scrubber head 32.

Figure 9:
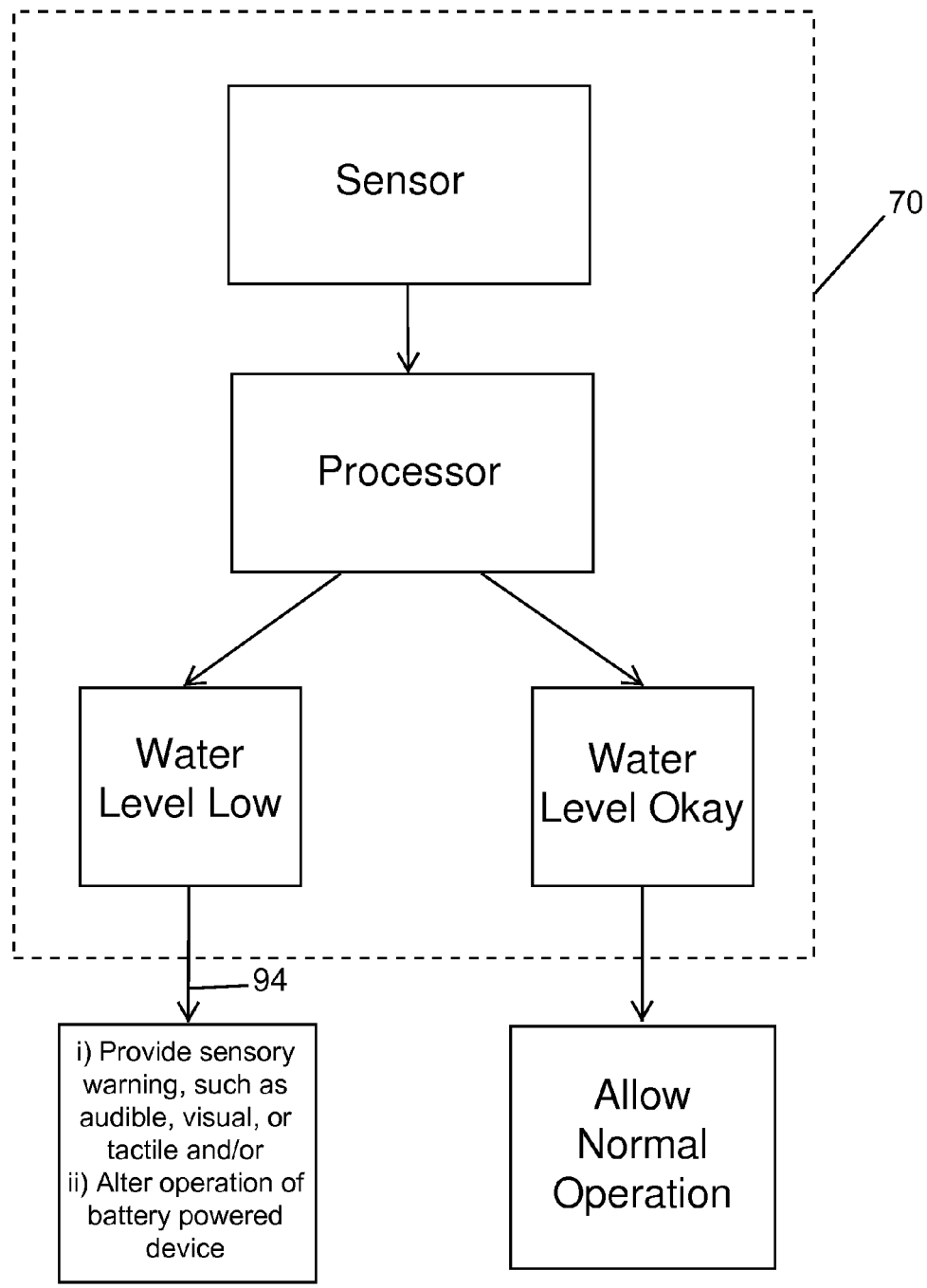
FIG. 9 is a schematic flow chart of the operation of the battery water level detector assembly in accordance with an aspect of the present invention.

The schematic operation of one embodiment of the battery water level detector assembly 50 is shown in FIG. 9. As there illustrated, sensor 82 provides an output indicative of the water level within a battery 38, which signal is then processed by controller 70 to determine whether or not the water level within battery is appropriate. If the water level is determined to be appropriate, normal operation of the floor scrubber 30 is continued. If the water level is determined to be low, controller 70 outputs control signals 94 that may be used to cause a sensory alert or warning to be triggered, such as causing light 51a to be illuminated, and/or trips relays 92 to prevent operation of scrubber head 32.

Changes and modifications in the specifically described embodiments can be carried out without departing from the principles of the present invention which is intended to be limited only by the scope of the appended claims, as interpreted according to the principles of patent law including the doctrine of equivalents. For example, FIG. 2 discloses a battery water level detector assembly 50 on one of the batteries 38, with cap assemblies 52 on each of batteries 38. It should be appreciated that assemblies 50 may be placed on each battery 38 by the inclusion of control units 54 on each of the cap assemblies 52. In which case scrubber 30 may be configured to trigger light 51a and trip relays 92 upon detection of a low level water condition in any one of the batteries.

As understood from FIG. 9, output signals 94 from controller 70 may also be used to additionally or alternatively cause other types of sensory alerts or warnings to be triggered. For example, an audible alarm 51b (FIG. 3) may be triggered, such as a beeping sound upon detection of a low water condition, or a tactile warning, such as a vibration of handle 51c (FIG. 3) may be triggered via a vibratory motor. Still further a battery powered device may also be equipped with a transmitter to provide an indication of a low water level condition remote from the battery powered device. With regard to the floor scrubber 30, for example, a transmitter 96 (FIG. 1) is provided that receives an output control signal 94 from controller 70, and in turn transmitter 96 sends an alert signal to provide a remote alert regarding the low water level condition. Various types and forms of transmitters 96 may be employed for providing various types of alert messages. For example, alerts such as a text message or email may be sent by transmitter 96, such as are viewable on a smart phone or other type of computing device.

Although shown in connection with a floor scrubber 30, it should be appreciated that battery water level detector assemblies in accordance with the present invention may be employed with alternative battery operated devices as well. Other such battery operated devices may include golf carts, forklift trucks, automated guided vehicles, electric transportation carts, such as people movers used in airports, utility carts, man lifts, tuggers, and the like. It should further be appreciated that the battery water level detector assembly may also be used with non-mobile battery operated devices.

Still further, control signals 94 may also be used to effect the operation of alternative or additional control parameters of a battery powered device, or provide further enhancements. Although discussed above in regard to preventing operation of motor 44 of floor scrubber 30, a control signal may be used to alter functionality of a battery powered device, such as to prevent or limit numerous other types of operations of a battery powered device. For example, a vacuum and/or a pump motor may be shut off or prevented from operating until the battery water level is again within specification, or if so equipped, a burnisher motor may be prevented from operation. Still further, the transport speed of a battery powered device may be limited. The lifting operation, such as for the forks of a forklift or the head of a floor scrubber could be prevented, such as preventing forks from lifting or the head of a floor scrubber from lowering. It should be understood that numerous different limitations or enhancements to the operation of battery powered devices may be employed to both prevent damage to the batteries, and provide an impetus for replenishing the battery water.

Battery water level detector assembly 50 is discussed above in regard to the use of a cap assembly 52 and an electronic sensor 82 configured as a reflective sensor. However, in alternative embodiments, battery water level detector assembly 50 does not require cap assembly 52 and/or may be used with alternative types of electronic sensors and alternative physical configuration. For example, one or more of batteries 38 may be provided with one or more unitary cap assemblies or plugs, each of which fit directly into one of the holes provided on a battery, such as one of holes 60a, 60b, 60c provided on battery 38. Various examples of such alternative cap assemblies are shown in FIGS. 10-12, where various such cap assemblies may be provided by Flow-Rite Controls of Byron Center, Mich.

As shown in FIG. 10, cap assembly 152 includes an optical indicator 158 that is substantially similar to optical indicator 58 discussed above, with indicator 158 including a lower end 160 and an upper end 162. As with indicator 58, lower end 160 contacts water in a battery when the water level is within the desired range, with upper end 162 displaying a dark visual appearance when end 160 is submerged in water within the battery 38, and end 162 having a white visual appearance when the water level decreases below end 160. Cap assembly 152, however, includes a sleeve portion 100 and a shoulder 102, where sleeve portion 100 is configured to be inserted into an opening on a battery, such as one of holes 60a, 60b, 60c provided on battery 38, with shoulder 102 then contacting flange 59 disposed about the respective hole 60 on battery 38. When used with cap assembly 152, a control unit may be constructed to align electronic sensor 82 with upper end 162 by affixing the control unit to the battery.

FIG. 11 illustrates an alternative cap assembly 252 that includes a sleeve portion 200, a shaft 204, upper end 206 and lower end 208. Sleeve portion 200 is configured for insertion into a manufacturer provided hole on a battery, with lower end 208 contacting water within the battery when the water level is within specification and lower end 208 not contacting water within the battery when the water level decreases beyond a desired level. As understood from FIGS. 11A and 11B, upper end 206 provides an alternative visual indication of the water level relative to cap assembly 152. Upper end 206 includes a lens through which the water within the battery can be viewed with a pattern being visible through the lens, which in the illustrated embodiment comprises a striation pattern. As understood from FIG. 11A, when the water level is within specification and contacting lower end 208, the striation pattern is shown to be distorted, such as may be caused by surface tension of the water contacting the lower end 208. And as understood from FIG. 11B, when the water level is below lower end 208 and therefore out of specification the striation pattern is not distorted. A control unit may therefore be provided with an alternative electronic optical sensor for operatively aligning with upper end 206 for detecting the change in the pattern, whereupon the appropriate output control signals may be provided.

Figure 12:
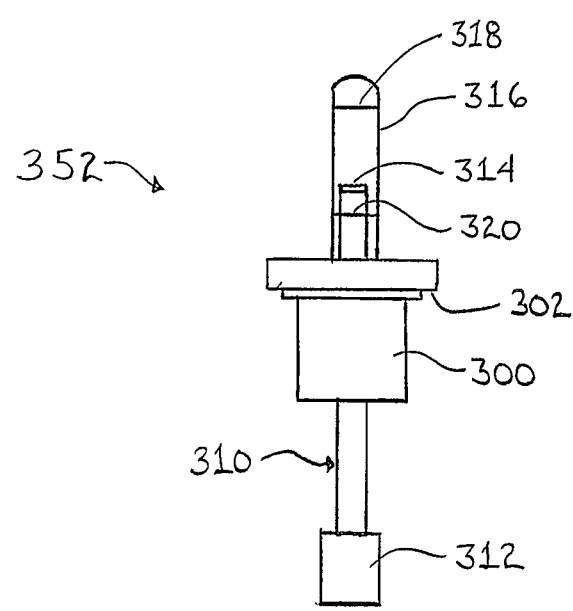

Referring now to FIG. 12 still another cap assembly 352 is disclosed which also includes a sleeve portion 300 for inserting into a single hole provided by a manufacturer on a battery, with cap assembly 352 operating in the manner of a mechanical float device. Cap assembly 352 further includes a shoulder portion 302, a float member 310 with a bulbous lower float end 312 and an upper end 314, where the upper end 314 of float member 310 moves within an optical scale member 316 that includes upper and lower gradations 318, 320. As water within the battery decreases, upper end 314 moves downward within member 316, and once upper end 314 is level with lower gradation 320 the battery is required to be replenished. Accordingly, a control unit may be provided with an electronic optical sensor for operatively detecting this position to thereby provide an appropriate output control signal.

The battery water level detector assembly is thus operative to detect a visual indication of a low battery water condition, with the detector assembly then providing output control signals to trigger a sensory alert, such as an audible sound or visual light, and/or limit operational parameters of the device or provide enhancements for providing an impetus to replenish the water within the batteries. The various cap assemblies discussed above thereby operate as visual indicators, with the electronic sensor of the battery water level detector detecting the indication of a low water condition.

The embodiments of the invention in which an exclusive property or privilege is claimed are defined as follows:

1. A battery operated device, said battery operated device comprising:
   a battery for powering said device and a battery water level detector assembly, said battery water level detector assembly comprising a control unit, an elongate optical indicator device, and a cap assembly;
   said cap assembly being mounted to said battery to cover a hole on said battery, said cap assembly including a filler tube extending downwardly into said hole of said battery, with said filler tube adapted to enable water to be provided into said battery;
   said optical indicator device being joined to said cap assembly and having a first end and a second end with said first end being outwardly disposed on said cap assembly and said second end extending downwardly into said hole of said battery;
   said control unit comprising a housing, a controller and an electronic sensor, said housing including an aperture with said electronic sensor comprising a light sensor disposed within said housing at said aperture, said light sensor adapted to provide a signal to said controller indicative of the water level within said battery with said controller providing a control signal in response thereto;
   wherein said housing is mounted to said cap assembly with said aperture of said housing aligned with said first end of said optical indicator device, and wherein said second end of said optical indicator device is adapted to contact water within said battery when the water level is at or above a predetermined level with said first end providing a visual indicator when said second end is not in contact with water within said battery, and wherein said electronic sensor detects when said second end is not in contact with water within said battery based on the visual indicator whereby said control unit detects that the water level within said battery has decreased below a desired level.

2. The battery operated device of claim 1, wherein said battery includes multiple holes and wherein said cap assembly includes multiple downwardly extending filler tubes.

3. The battery operated device of claim 1, wherein said housing is separate from said cap assembly and is adapted to attachably mount to said cap assembly.

4. The battery operated device of claim 1, wherein said battery operated device further includes a sensory alert mechanism operable to provide an alert responsive to said control signal, and wherein said control signal triggers said alert when the water level in said battery is below the desired level with said alert comprising at least one of (i) an audible warning, (ii) a visual warning light, and (iii) a tactile warning.

5. The battery operated device of claim 1, wherein said battery operated device includes a transmitter operable to send an alert signal to a remote receiving device, and wherein said control signal triggers said transmitter to send said alert signal when the water level in said battery is below the desired level.

6. The battery operated device of claim 1, wherein the battery powered operational functionality of said battery operated device is altered in response to said control signal output by said controller when the water level in said battery is below the desired level.

7. The battery operated device of claim 1, wherein said battery operated device includes a plurality of batteries and a plurality of battery water level detector assemblies.

8. The battery operated device of claim 1, wherein said battery operated device comprises a floor scrubber.

9. The battery operated device of claim 8, wherein said control signal at least one of (i) triggers an alert that the battery water level is below a desired level and (ii) alters the battery powered operational functionality of said floor scrubber.

10. A method of controlling operation of a battery powered device having at least one battery, said method comprising:
providing a battery water level detector assembly, said battery water level detector assembly comprising a control unit, an elongate optical indicator device, and a cap assembly, said cap assembly being mounted to the battery to cover an opening on the battery with said cap assembly including a downwardly extending filler tube adapted to extend into the opening of the battery to enable water to be provided therein, said optical indicator device being joined to said cap assembly and having a first end and a second end with said first end being outwardly disposed on said cap assembly and said second end extending downwardly whereby said second end is adapted to extend into the opening of the battery, said control unit comprising a housing, a controller and an electronic sensor, said housing including an aperture with said electronic sensor comprising a light sensor disposed within said housing at said aperture, wherein said housing is mounted to said cap assembly with said aperture of said housing aligned with said first end of said optical indicator device, and wherein said second end of said optical indicator device is adapted to contact water within the battery when the water level is at or above a predetermined level, with said first end providing a visual indicator when said second end is not in contact with water within the battery, and wherein said light sensor is adapted to provide a signal to said controller indicative of the water level within the battery with said controller providing a control signal in response thereto;
sensing the water level within the battery of the battery powered device with said light sensor, with said light sensor adapted to detect when a visual indicator of said optical indicator device provides a display that the water level within the battery has decreased below a desired level; and
providing said control signal by said controller upon sensing that the water level within the battery has decreased below a desired level, wherein responsive to said control signal at least one of (i) an alert is triggered that the water level within the battery has decreased below a desired level, and (ii) the battery powered operational functionality of the battery operated device is altered.

11. A battery water level detector assembly comprising:
a cap assembly, said cap assembly adapted to mount to a battery to cover a hole on the battery, said cap assembly including a downwardly extending filler tube adapted to extend into the hole of the battery to enable water to be provided therein;
an elongate optical indicator device joined to said cap assembly, said optical indicator device having a first end and a second end with said first end being outwardly disposed on said cap assembly and said second end extending downwardly whereby said second end is adapted to extend into the hole of the battery;
a control unit, said control unit comprising a housing, a controller and an electronic sensor, said housing including an aperture with said electronic sensor comprising a light sensor disposed within said housing at said aperture, said light sensor adapted to provide a signal to said controller indicative of the water level within said battery;
wherein said housing is mounted to said cap assembly with said aperture of said housing aligned with said first end of said optical indicator device, and wherein said second end of said optical indicator device is adapted to contact water within the battery when the water level is at or above a predetermined level with said first end providing a visual indicator when said second end is not in contact with water within the battery, and wherein said light sensor detects when said second end is not in contact with water within the battery based on the visual indicator whereby said controller of said control unit detects that the water level within the battery has decreased below a desired level.

12. The detector assembly of claim 11, wherein said cap assembly includes at least one additional downwardly extending filler tube, and wherein each said filler tube is adapted to extend into a separate hole of the battery.

13. The detector assembly of claim 11, wherein said first end of said optical indicator device is mounted at a top surface of said cap assembly with said first end disposed upwardly.

14. The detector assembly of claim 11, wherein said housing is separate from said cap assembly and is adapted to attachably mount to said cap assembly.

15. The detector assembly of claim 14, wherein said housing includes a latch for attaching said housing to said cap assembly.

16. The detector assembly of claim 15, wherein said cap assembly includes an outwardly projecting lip, and wherein said latch of said housing attaches to said lip.

17. The detector assembly of claim 14, wherein said cap assembly includes an outwardly projecting lip disposed about said cap assembly, and wherein said housing includes a pair of latches for attaching said housing to said cap assembly.

18. The detector assembly of claim 14, wherein said first end of said optical indicator device is mounted at a top surface of said cap assembly with said first end disposed upwardly, and wherein said aperture of said housing is disposed on a bottom of said housing, wherein said bottom of said housing engages with said top of said cap assembly.

19. The detector assembly of claim 11, wherein said light sensor comprises an infrared light sensor.

* * * * *